United States Patent
Kuri

(10) Patent No.: US 10,091,565 B2
(45) Date of Patent: Oct. 2, 2018

(54) WAVELENGTH DEMULTIPLEXER AND WAVELENGTH MULTIPLEXER USING SAME

(71) Applicant: National Institute of Information and Communications Technology, Tokyo (JP)

(72) Inventor: Toshiaki Kuri, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 26 days.

(21) Appl. No.: 15/300,487

(22) PCT Filed: Feb. 27, 2015

(86) PCT No.: PCT/JP2015/056578
§ 371 (c)(1),
(2) Date: Sep. 29, 2016

(87) PCT Pub. No.: WO2015/151716
PCT Pub. Date: Oct. 8, 2015

(65) Prior Publication Data
US 2017/0118545 A1    Apr. 27, 2017

(30) Foreign Application Priority Data

Apr. 1, 2014  (JP) .................................. 2014-075271

(51) Int. Cl.
*H04J 14/00* (2006.01)
*H04B 10/00* (2013.01)
(Continued)

(52) U.S. Cl.
CPC ....... *H04Q 11/0005* (2013.01); *G02B 6/2938* (2013.01); *G02B 6/29397* (2013.01);
(Continued)

(58) Field of Classification Search
CPC ......... H04Q 11/0005; H04Q 2011/002; H04Q 2011/0032; H04Q 2011/0035;
(Continued)

(56) References Cited

U.S. PATENT DOCUMENTS 5,416,769 A * 5/1995 Karol ...................... H04L 49/20
                                                                370/414
5,617,234 A * 4/1997 Koga .................. G02B 6/12011
                                                                 385/37
(Continued)

FOREIGN PATENT DOCUMENTS

JP   2009-033226 A * 7/2007 .............. H04J 14/00
JP   2008-067048 A   3/2008
(Continued)

OTHER PUBLICATIONS

Toshiaki Kuri et al., "Reconfigurable Dense Wavelength-Division-Multiplexing Millimeter-Waveband Radio-Over-Fiber Access System Technologies", Journal of Lightwave Technology, vol. 28, No. 16, Aug. 15, 2010.*
(Continued)

*Primary Examiner* — Ken N Vanderpuye
*Assistant Examiner* — Abbas H Alagheband
(74) *Attorney, Agent, or Firm* — Sughrue Mion, PLLC

(57) ABSTRACT

A wavelength demultiplexer is equipped with a spectroscopic means (which separates light that is input from multiple input light paths, and outputs the light to multiple output light paths) and a light path switching device (a device that switches the light paths that are input to the spectroscopic means, with the switching being performed by an external operation), and the light path switching device may be a device that distributes the input from one input port to multiple output ports. The light path switching device and the spectroscopic means are polarization-independent, with
(Continued)

the input light paths, the output light paths, and the light paths between the light path switching device and the spectroscopic means being polarization-maintaining light paths, so the relative polarization configuration is the same for the input light and the output light.

7 Claims, 8 Drawing Sheets

(51) Int. Cl.
- *G02B 6/26* (2006.01)
- *H04Q 11/00* (2006.01)
- *H04B 10/2575* (2013.01)
- *H04J 14/06* (2006.01)
- *G02B 6/293* (2006.01)

(52) U.S. Cl.
CPC ......... *H04B 10/2575* (2013.01); *H04J 14/06* (2013.01); *H04Q 2011/002* (2013.01); *H04Q 2011/0032* (2013.01); *H04Q 2011/0035* (2013.01); *H04Q 2213/017* (2013.01)

(58) Field of Classification Search
CPC ............ H04Q 2213/017; G02B 6/2938; G02B 6/29397; H04B 10/2575; H04J 14/06
USPC ...................................... 398/48, 152; 385/16
See application file for complete search history.

(56) References Cited

U.S. PATENT DOCUMENTS

| | | | | |
|---|---|---|---|---|
| 5,841,500 A * | 11/1998 | Patel | ................. | G02F 1/133371 349/141 |
| 6,268,952 B1 * | 7/2001 | Godil | ................. | G02B 26/0808 359/247 |
| 7,035,505 B2 * | 4/2006 | Shen | ................. | H04B 10/0795 385/24 |
| 7,130,505 B2 * | 10/2006 | Shen | ................. | G02B 6/12019 385/24 |
| 7,245,829 B1 * | 7/2007 | Sindile | ................. | H04J 14/0227 398/45 |
| 9,106,983 B2 * | 8/2015 | Ji | ................. | H04Q 11/00 |
| 9,172,488 B2 * | 10/2015 | Sato | ................. | H04J 14/0204 |
| 9,231,696 B2 * | 1/2016 | Urban | ................. | G01M 11/3127 |
| 2002/0141693 A1 * | 10/2002 | Whiteaway | ........ | G02B 6/12021 385/24 |
| 2002/0196492 A1 * | 12/2002 | Trisnadi | ................. | G02B 6/2713 398/79 |
| 2003/0133641 A1 * | 7/2003 | Yoo | ................. | B82Y 20/00 385/14 |
| 2005/0031259 A1 * | 2/2005 | Shen | ................. | H04B 10/0795 385/24 |
| 2005/0063703 A1 * | 3/2005 | Lee | ................. | H04Q 11/0005 398/49 |
| 2006/0153498 A1 * | 7/2006 | Shen | ................. | G02B 6/12019 385/24 |
| 2008/0106778 A1 * | 5/2008 | Ma | ................. | G02B 6/274 359/223.1 |
| 2008/0145052 A1 * | 6/2008 | Hecker | ................. | H04J 14/02 398/65 |
| 2009/0067837 A1 * | 3/2009 | Hesse | ................. | H04L 47/56 398/51 |
| 2011/0026534 A1 * | 2/2011 | Touch | ................. | H04Q 11/0005 370/401 |
| 2012/0275788 A1 * | 11/2012 | Li | ................. | H04Q 11/0005 398/45 |
| 2012/0293856 A1 * | 11/2012 | Onaka | ................. | H01S 3/235 359/276 |
| 2014/0029942 A1 * | 1/2014 | Sato | ................. | H04J 14/0204 398/48 |
| 2014/0178068 A1 * | 6/2014 | Sato | ................. | H04Q 11/0005 398/46 |
| 2014/0212130 A1 * | 7/2014 | Urban | ................. | G01M 11/3127 398/13 |
| 2015/0117860 A1 * | 4/2015 | Braun | ................. | H04J 14/0282 398/58 |

FOREIGN PATENT DOCUMENTS

| | | |
|---|---|---|
| JP | 2009-033226 A | 2/2009 |
| JP | 2009-065434 A | 3/2009 |
| WO | 2013/018867 A1 | 2/2013 |
| WO | 2013/164044 A1 | 11/2013 |

OTHER PUBLICATIONS

Toshiaki Kuri, et al., "Reconfigurable Dense Wavelength-Division-Multiplexing Millimeter-Waveband Radio-Over-Fiber Access System Technologies", Journal of Lightwave Technology, Aug. 15, 2010, pp. 2247-2257, vol. 28, No. 16.

International Search Report for PCT/JP2015/056578 dated Apr. 14, 2015 [PCT/ISA/210].

Communication dated Oct. 23, 2017 issued by the European Patent Office in counterpart application No. 15772724.9.

Niwa T et al.: "A 270 x 270 optical cross-connect switch utilizing wavelength routing with cascaded AWGs", Optical Fiber Communication Conference and Exposition and the National Fiber Optic Engineers Conference (OFC/NFOEC), 2013, IEEE, Mar. 17, 2013 (Mar. 17, 2013), pp. 1-3, XP032678889 (3 pages total).

Ortega B et al.: "Flexible Capacity Assignment in a Multiwavelength Radio Over Fiber Access Network", Optical Fiber Communication (OFC 2007) Collocated National Fiber Optic Engineers Conference : Anaheim, CA, Mar. 25-29, 2007, IEEE Service Center, Mar. 1, 2007 (Mar. 1, 2007), pp. 1-3, XP031146437 (3 pages total).

* cited by examiner

WAVELENGTH DEMULTIPLEXER AND WAVELENGTH MULTIPLEXER USING SAME

CROSS REFERENCE TO RELATED APPLICATIONS

This application is a National Stage of International Application No. PCT/JP2015/056578 filed Feb. 27, 2015 (claiming priority based on Japanese Patent Application No. 2014-075271 filed Apr. 1, 2014), the contents of which are incorporated herein by reference in their entirety.

TECHNICAL FIELD

The present invention relates to a wavelength demultiplexer applicable to wavelength multiplexing technology used in radio over fiber technologies and a wavelength multiplexer using the same.

BACKGROUND ART

Radio over fiber (RoF) networks for radio waves in the millimeter-wave frequency band are expected as a future infrastructure technology because an effective increase in the coverage of wireless access networks that use the radio waves is possible. Additionally, wavelength division multiplexing (WDM) technology is very attractive since in millimeter-wave frequency band RoF networks, the device configuration of a remote access unit (RAU) having an antenna disposed therein is simplified to minimize cost and power consumption and a remote node (RN) having a function of multiplexing and demultiplexing WDM signals is capable of widely distributing RoF signals to a large number of RAUs. Accordingly, millimeter-wave frequency band RoF networks that use WDM technology are low in maintenance cost as well as excellent in cost effectiveness, and can also provide low power consumption structures.

With the great increase in the demand for wireless access and its communication speed, the way in which mobile traffic is accommodated in cooperation with an optical access network (fixed network) has given rise to an important issue. From a physical point of view, one solution to this issue is the use of RoF technology. This technology is also receiving attention in the fronthaul standardization of wireless access networks. Nowadays, for example, this technology is drawing much attention also in the standardization of NG-PON2 (Next Generation Passive Optical Network 2), which is under study, in such a manner that a controversy over the accommodation of mobile traffic using the PtP-WDM (Point To Point Wavelength Division Multiplex) scheme exists. In general, the fusion of WDM (Wavelength Division Multiplex) technology and this RoF technology is considered to become essential in the near future. Further, also in various wireless systems other than mobile ones (for example, broadcasting, standard radio waves, radar, wireless sensors, etc.), it is unavoidable that the fusion of WDM technology and RoF technology become a key constituent technology for the collection and distribution of wireless signals at a large number of points.

This requirement can be satisfied by realizing, for example, traffic control for a distributed antenna system (DAS) by using a conventional electrical cross-connect switch (XC-SW) disposed in a central station (CS). However, such electrical dynamic channel allocation (DCA) makes it difficult to completely avoid electromagnetic interference (EMI) between wireless signals within the CS-dedicated domain. Thus, dynamic optical channel allocation in which DCA is performed in the optical domain has become a solution for electromagnetic interference.

As a conventional dynamic optical channel allocation device, there is known, for example, a delivery-and-coupling optical switch board (DCSW: Delivery and Coupling Switch) illustrated in FIG. 1. The DCSW is configured to switch light paths by using thermo-optic switches (TO-SWs) and to couple beams of light by using optical couplers so as to perform optical signal distribution and combining in units of light paths but is not configured to perform the distribution and combining on channels having different wavelengths in the wavelength division multiplex transmission scheme. That is, the DCSW is configured to, when an optical signal including multiple optical channel components based on the wavelength division multiplex transmission scheme is input from each input port, dynamically allocate each input optical signal to any output destination by using a TO-SW, multiplex, by an optical coupler provided for each output port, respective optical signals output from the corresponding TO-SWs by using power combining, and output the resulting signal. In this conventional scheme, however, the switching of light paths is performed by repeating two splits, and there is a drawback with regard to the number of channels n in which as the number of channels increases, the splitting loss increases, which results in an increase in insertion loss. If the splitting loss affects system performance, it is inevitable to perform power supply with optical amplification or the like to compensate for the loss. In addition, since the characteristics of the optical coupler used do not include wavelength selectivity, there is no function for collecting multiple optical frequency channel components allocated as desired by using the wavelength division multiplex transmission scheme and for wavelength division multiplexing all the channel components into a single light path.

As a conventional scheme to overcome the foregoing situation, the use of an arrayed waveguide grating (AWG) instead of an optical coupler has also been proposed (PTL 1). However, since channel switching is performed for each wavelength, it is difficult to handle RoF signals including multiple wavelength components, signals with optical-frequency-interleaved channels, and the like.

The present invention also adopts a spectroscopic means such as the AWG described above, with the AWG being known to have the following input/output relationship (FIG. 5 in PTL 2). That is, when, as illustrated in FIG. 2(a), beams of light having wavelengths v1 to vn are input to the uppermost one of input ports in an array, with regard to the corresponding output port, when input, given that v1 to vn are sequentially output to the respective output ports, as illustrated in FIG. 2(b), for example, in response to beams v1 to vn of light being input to the (n−1)-th port, v1 and v2 are respectively output to the (n−1)-th and n-th output ports and the beams v3 to vn of light are respectively output to the first to (n−2)-th output ports.

A description will be given here of the operation of a known wavelength demultiplexer illustrated in FIG. 3 (PTL 1, NPL 1). The wavelength demultiplexer, which is constituted by an optical coupler (OC) and a 2×N (2-input N-output) AWG, performs the following operation. In this example configuration, for example, the AWG has 62.5-GHz-spacing inputs and 25-GHz-spacing outputs, and, at each output of the AWG, as illustrated in FIG. 3(b), a combination of a carrier and a sideband wave (for example, an upper sideband wave) is selected. This demultiplexer actively utilizes the narrow bandpass characteristics of the AWG.

Input signals in FIG. 3 are assumed to be wavelength-multiplexed signals arranged in the respective channels in an orderly way, as illustrated in FIG. 3(a). In some cases, however, as illustrated in FIG. 6, the signals may have (a) variations in the spacing between a subcarrier and a modulated wave or (b) signal strengths which differ from channel to channel. In such cases, in the illustrated wavelength demultiplexer, a subcarrier and a modulated wave having different signal strengths may be combined and the output of the wavelength demultiplexer is often output-channel-dependent.

The present invention is intended to achieve a stable separation output even for the wavelength-multiplexed signals illustrated in FIG. 6.

CITATION LIST

Patent Literature

PTL 1: Japanese Unexamined Patent Application Publication No. 2008-67048
PTL 2: Japanese Unexamined Patent Application Publication No. 2009-33226

Non Patent Literature

NPL 1: T. Kuri, H. Toda and K. Kitayama, "Novel Demultiplexer for Dense Wavelength-Division Multiplexed Millimeter-Wave-Band Radio-Over-Fiber Systems With Optical Frequency Interleaving Technique", IEEE PHOTONICS TECHNOLOGY LETTERS, VOL. 19, NO. 24. Dec. 15, 2007

SUMMARY OF INVENTION

Technical Problem

In a conventional technology, wavelength demultiplexing has been possible only when a radio over fiber signal has a single prescribed frequency interval. In the present invention, in contrast, it is possible to handle cases in which the frequency interval of the radio over fiber signal is changed.

Solution to Problem

To this end, a wavelength demultiplexer of the present invention includes spectroscopic means and a light path switching device, the spectroscopic means being a device that separates light input from multiple input light paths and outputs the light to multiple output light paths, the light path switching device being a device that switches light paths which are input to the spectroscopic means, at least the light paths which are input to the spectroscopic means being switchable by an external operation.

In addition, the light path switching device is a device that significantly distributes, for at least one input port, an input from the input port to multiple output ports.

The light path switching device is provided with, on an input port side thereof and an output port side thereof, delay means for reducing an influence of a difference in light path length.

In addition, the light path switching device and the spectroscopic means are polarization-independent, and input light paths of the light path switching device, the output light paths of the spectroscopic means, and light paths connecting the light path switching device and the spectroscopic means are polarization-maintaining light paths, so that a relative polarization configuration for an arrangement order of the input light paths of input light to the light path switching device and a relative polarization configuration for an arrangement order of the output light paths, corresponding to the arrangement order of the input light paths, of output light from the spectroscopic means are made the same.

In addition, a transmission characteristic of the spectroscopic means from an input side thereof to an output side thereof for light paths that are input from the light path switching device is that a frequency width exhibiting flatness with a tolerance of 1 dB is greater than or equal to 37% of an adjacent optical frequency interval on the output side.

In addition, the present invention provides a wavelength multiplexer, wherein a wavelength-multiplexed signal is obtained by inputting light from an output side of the wavelength demultiplexer and outputting light from an input side of the light path switching device.

Advantageous Effects of Invention

In a conventional technology, wavelength demultiplexing has been possible only for a radio over fiber signal having a defined specific frequency interval, whereas the present invention adopts a variable-splitting-ratio switch that performs not only a normal ON/OFF operation but also other operations, instead of an optical power splitter (for example, a 3-dB optical coupler) which is used conventionally. The term splitting ratio of the switch, as used here, is defined as the ratio of two output powers to each other at a one-input two-output element. This can address a change in the frequency interval of a radio over fiber signal. In particular, by setting the splitting ratio of the switch to 1:1 and allowing free selection of an input port of a multiple-input multiple-output spectroscopic device (in examples, an arrayed waveguide grating (AWG)), it is possible to support multiple frequency intervals of a radio over fiber signal.

DESCRIPTION OF EMBODIMENTS

An embodiment of the present invention will be described in detail hereinafter with reference to the drawings. In the following description, devices having the same function or similar functions are denoted by the same numerals unless there is some special reason.

EXAMPLE 1

Figure 4:
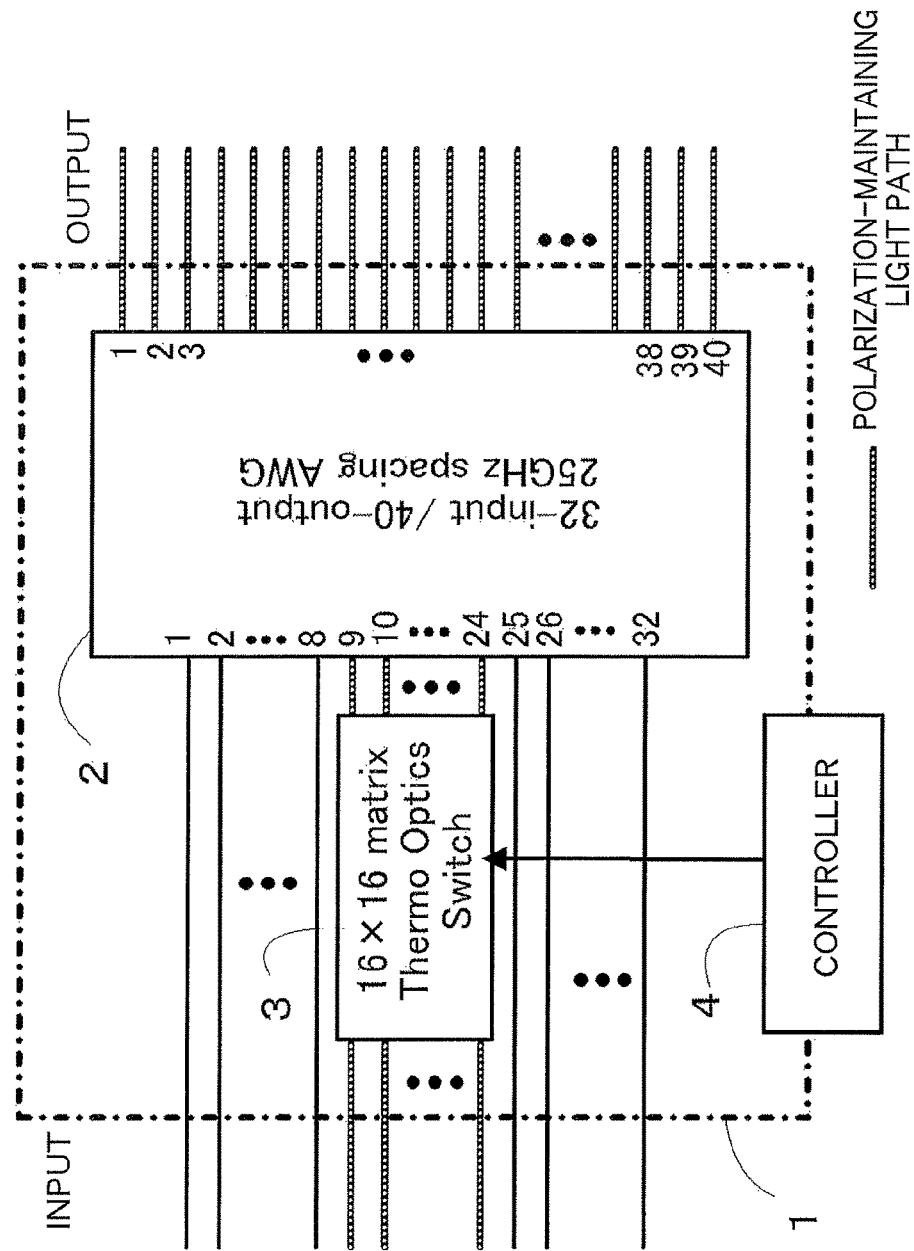
FIG. 4 is a diagram illustrating a wavelength demultiplexer of the present invention.

FIG. 4 illustrates a block diagram of a wavelength demultiplexer 1 of the present invention. In this example, a 16×16-port variable-splitting-ratio matrix optical switch is used as a light path switching device 3. Each element of this optical switch is a thermo-optic switch having a Mach-Zehnder configuration, and the light path switching device 3 is controlled by a controller 4. The output of the light path switching device 3 is input to the ninth to twenty-fourth ports of an AWG of a spectroscopic means 2. To the wavelength demultiplexer 1, an optical signal obtained by frequency multiplexing a modulated wave and a subcarrier in respective frequency bands which are obtained as a result of division so as to match the channel configuration of the AWG is input.

This configuration makes it possible to switch the light paths that are input to the spectroscopic means 2, and allows an optical signal extracted for each wavelength from multiple light paths to be obtained in a specific output light path of the AWG.

As a multiple-input multiple-output light path switching device, there are known a lattice matrix switch implemented by a gate switch, a non-blocking switch implemented by a crossbar switch, and so on. Furthermore, as a switch element, there are known a variety of switch elements such as of a directional coupler type, a Mach-Zehnder interferometer type, a semiconductor optical absorption type, and a variable reflecting mirror type. The present invention is also applicable to other cases as well as the cases described above.

Figure 1:
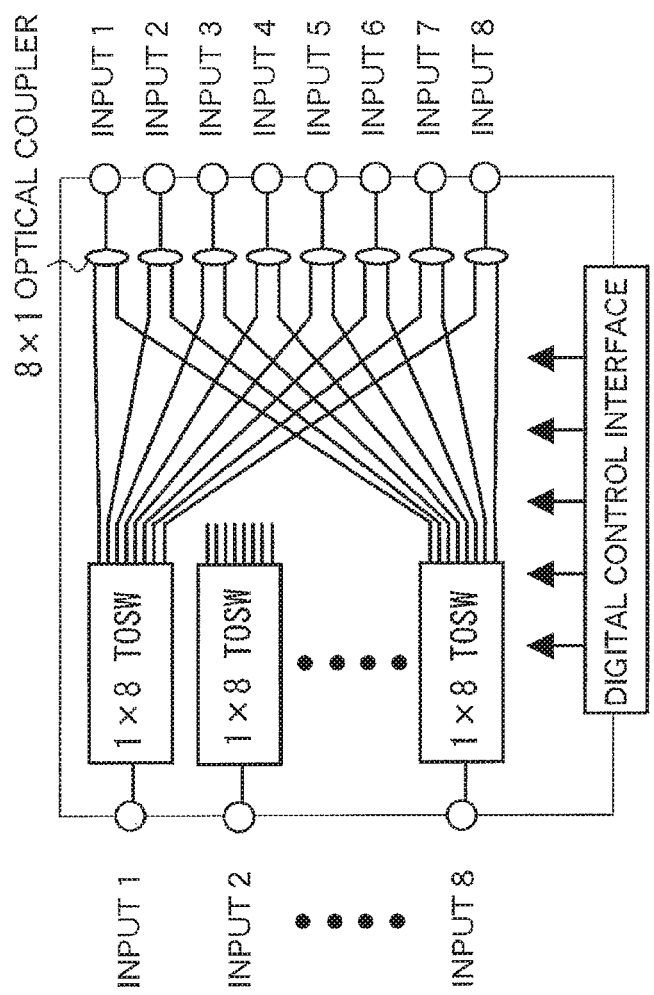
FIG. 1 is a diagram illustrating a conventional example of a delivery-and-coupling optical switch board.
Figure 2:
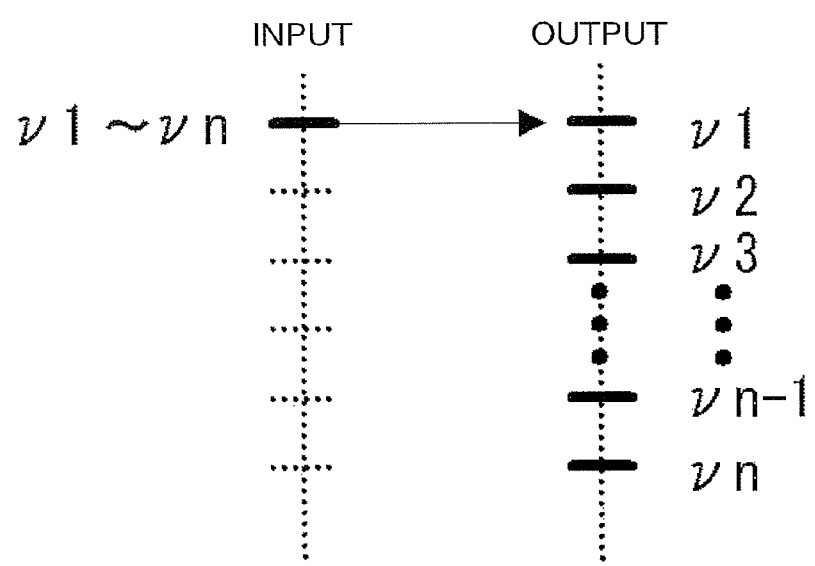
FIGS. 2(a) and 2(b) are diagrams illustrating the characteristics of an AWG used in the present invention.
Figure 2:
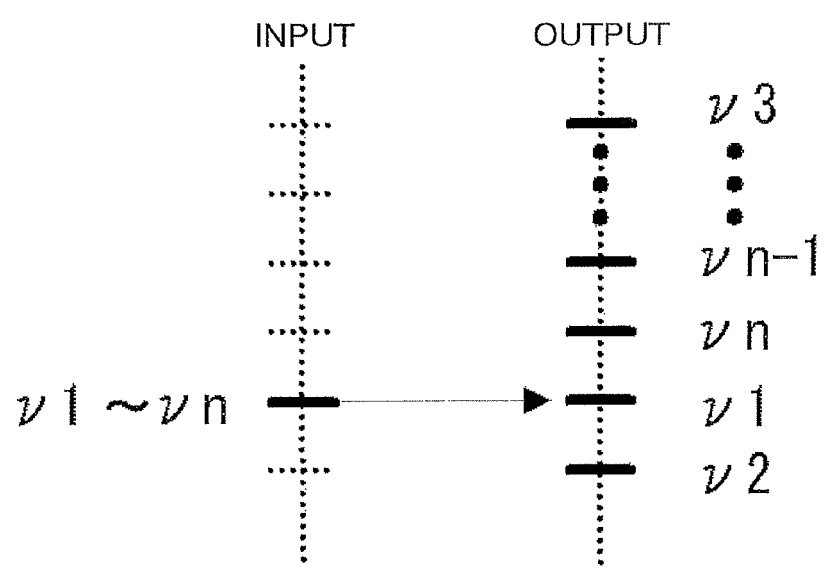
Figure 3:
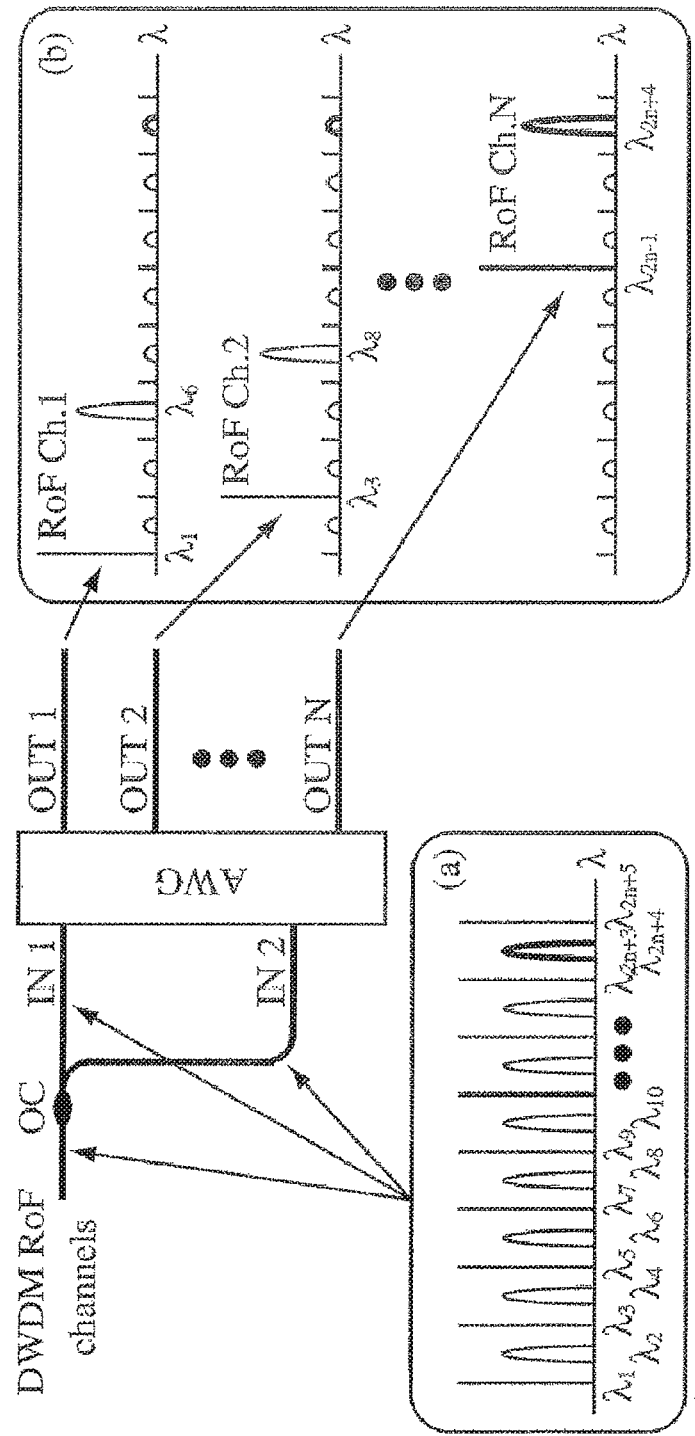
FIG. 3 is a diagram illustrating a wavelength demultiplexer in an example configuration of a remote node (RN).

For example, in a case where the AWG described above has characteristics of a 25-GHz-spacing arrangement, from the principle in FIG. 3, two input ports having a frequency interval of 25 GHz, 50 GHz, 75 GHz, 100 GHz, or the like are selected, making it easy to separate and obtain a RoF signal having a frequency difference of 25 GHz, 50 GHz, 75 GHz, 100 GHz, or the like from output ports.

In the configuration in FIG. 4, polarization-maintaining light paths are used for the input light paths of the optical switch as the light path switching device 3, the output light paths of the AWG of the spectroscopic means 2, and light paths connecting the optical switch and the AWG, and the optical switch and the AWG, which are of a polarization-independent type, are used. This makes it possible to hold the relative polarization configuration for the arrangement order of the input light paths of input light to the light path switching device and to make this relative polarization configuration the same as the relative polarization configuration for the arrangement order of the output light paths, corresponding to the arrangement order of the input light paths, of output light from the spectroscopic means. The term relative polarization configuration, as used here, refers to, for example, the arrangement in the same polarization direction or at the same order or difference in polarization ellipticity and polarization azimuth angle.

Figure 5:
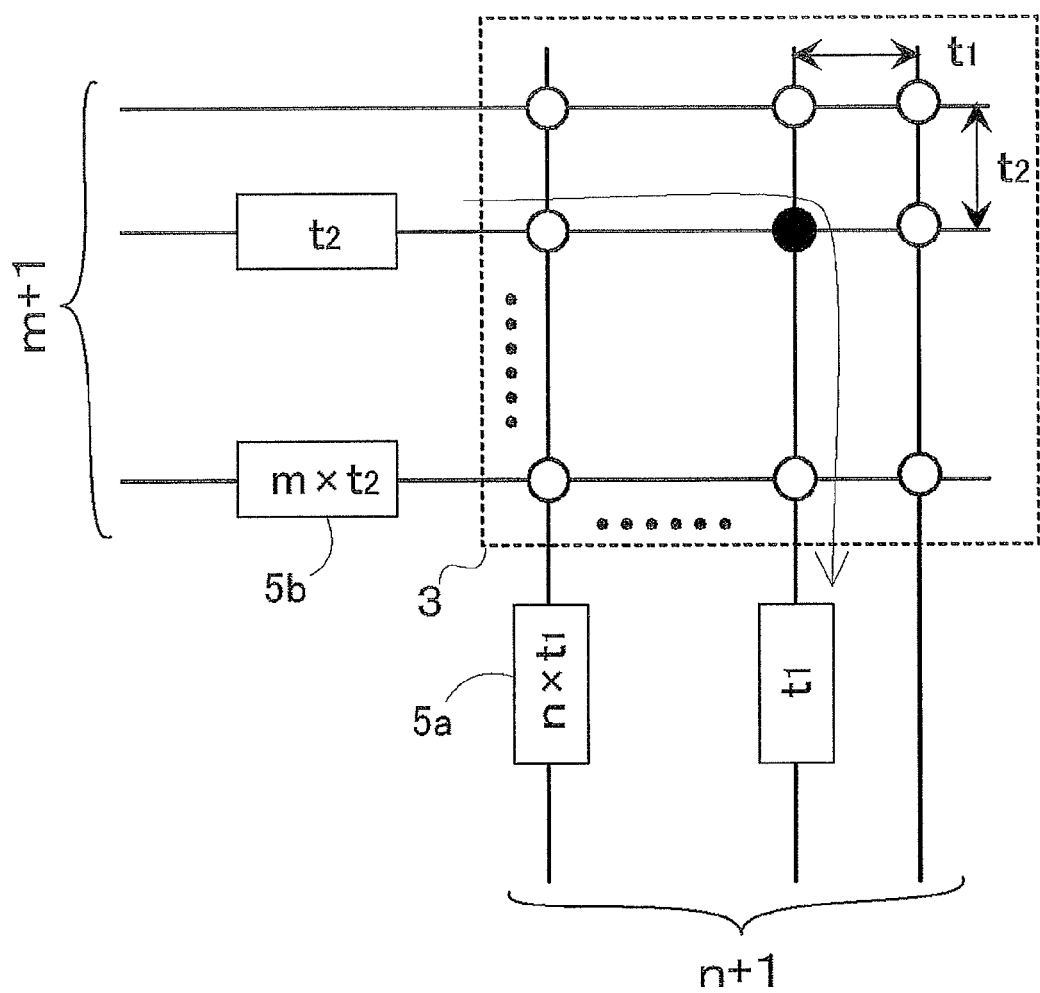
FIG. 5 is a block diagram illustrating an example of a light path switching device having delay means.

In FIG. 5, in a case where the light path switching device 3 is a matrix optical switch, in order to make delay times caused by the difference in light path length which is due to the difference in path uniform, delay means for compensating for the difference in light path length are provided for the input light paths and output light paths of the light path switching device 3. FIG. 5 depicts a case in which the duration of the delay between gate switches is uniformly t1 in the lateral direction and is uniformly t2 in the vertical direction, and the (m+1) light paths in the vertical direction and (n+1) light paths in the lateral direction are included. The zeroth to (n×t1)-th delay elements 5a are provided in a horizontal line with the difference in delay time being t1 and the zeroth to (m×t2)-th delay elements 5b are provided in a vertical line with the difference in delay time being t2. Thus, the delay times taken for light to travel through the delay element and light path switching device 3 are made equal. In this manner, making the delay times required for traveling equal can also support extremely short pulses.

In addition, it is desirable to even out the difference in delay time for each channel in the AWG described above by using a delay element, as necessary. This delay element can be configured to also serve as a delay element on the output side of the light path switching device.

In addition, a constituent switch included in the optical switch may also be implemented by using a variable-splitting-ratio switch that not only performs a normal ON/OFF operation but also makes the splitting ratio variable. This enables a change at a ratio that allows an effect to be confirmed. This allows various outputs to be obtained from a specific light path of the spectroscopic means, and allows the wavelength demultiplexer to be also provided with various outputs.

Figure 6:
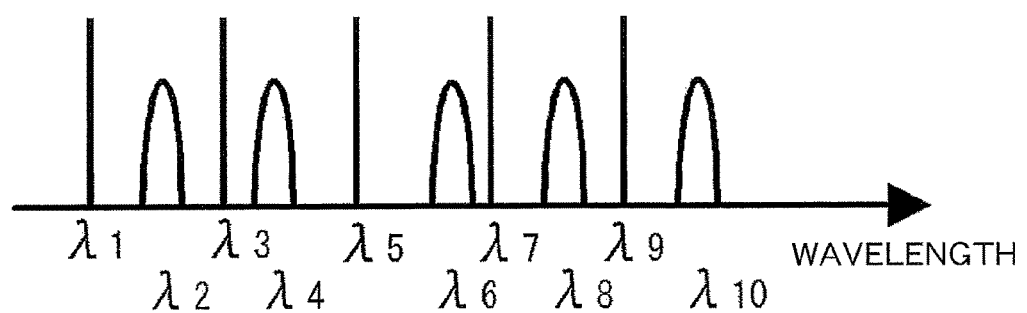
FIGS. 6(a) and 6(b) are diagrams illustrating cases in which wavelength-multiplexed signals to be input have (a) variations in the spacing between a subcarrier and a modulated wave, and (b) signal strengths which differ from channel to channel.
Figure 6:
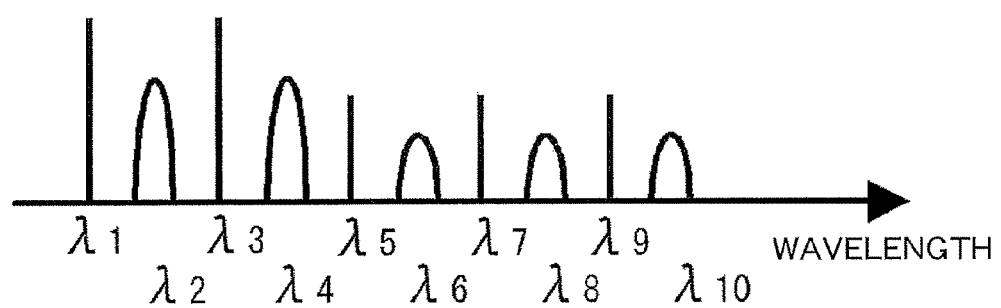

For example, as illustrated in FIG. 6(a), a wavelength-multiplexed signal to be input has variations in the spacing between a subcarrier and a modulated wave. In this case, due to the transmission characteristics of each channel of the AWG, a modulated wave deviated from the center of the channel is attenuated. However, a subcarrier which is substantially at the center of the channel is less attenuated than the modulated wave described above. It is thus required to suppress the strength of the subcarrier. In this situation, the variable-splitting-ratio switch described above is capable of adjusting the strength of the subcarrier and using the strength of the subcarrier to create a balance with the strength of the modulated wave. Furthermore, as illustrated in FIG. 6(b), the situation in which the signal strength differs from channel to channel may occur in a signal in which multiplexed signals from two signal sources are multiplexed, for example. In such a wavelength-multiplexed signal described above, the combination of a subcarrier with low strength and a modulated wave with high strength is demodulated by using a photodiode, resulting in a distorted output signal being obtained, as in diode detection of an overmodulated signal in AM modulation, which is not desirable. That is, in this case, it is desirable to adjust the modulated wave with high strength by using the variable-splitting-ratio switch described above to achieve a balance in strength between the subcarrier and the modulated wave.

It is also desirable that, although not illustrated in the drawings, the control of the light path switching device 3 by the controller 4 include control in which the frequency interval or signal strengths described above are fed back to achieve a balance of signal strengths in the respective channels of the AWG.

EXAMPLE 2

More specifically, the light path switching device 3 in FIG. 4 is obtained by, for example, forming a Mach-Zehnder interferometer on a PLC (Planar Lightwave Circuit), in which one light path heater is used for heating to change the interference state to form a switch, and is a commercially available product having 16-ch input×16-ch output (NTT Electronics Corporation). In addition, the AWG of the spectroscopic means 2 is that having 32-ch input×40-ch output with a channel spacing of 25 GHz. The transmission spectrum of a flat-top type is desirable, and, for example, the 1-dB bandwidth is greater than or equal to 9.3 GHz for a wavelength of 1556.353 to 1548.509 nm (0.2 nm/ch), which accounts for 37% of the channel spacing.

EXAMPLE 3

A wavelength-multiplexed signal can be obtained by inputting, from the output side of the wavelength demultiplexer described above, a modulated wave and a subcarrier in respective frequency bands obtained as a result of division so as to match the channel configuration of the AWG and by outputting them from the input side of the light path switching device. That is, the wavelength demultiplexer described above operates as a wavelength multiplexer.

INDUSTRIAL APPLICABILITY

The present invention is applied to a millimeter-wave frequency band RoF network. This makes it possible to select, as desired, the combination of an optical carrier and a sideband wave and to easily change the frequency band of a millimeter wave to be transmitted.

In addition, the millimeter-wave accommodation in a RoF signal in the millimeter-wave frequency band is performed by using light having a wavelength with which easy wavelength multiplexing is achievable. For example, light having the same wavelength as that of the carrier among wavelengths selected for the transmission of the RoF signal is used.

REFERENCE SIGNS LIST

1 wavelength demultiplexer
2 spectroscopic means
3 light path switching device
4 controller
5*a*, 5*b* delay element

The invention claimed is:

1. A wavelength demultiplexer comprising:
a spectroscopic device configured to separate light input from multiple input light paths and output the separated lights to multiple output light paths; and
a light path switching device configured to switch light paths which are input to the spectroscopic device,
wherein at least one of the light paths which are input to the spectroscopic device being switchable by an external operation, and
wherein the light path switching device and the spectroscopic device are polarization-independent, and input light paths of the light path switching device, the output light paths of the spectroscopic device, and light paths connecting the path switching device and the spectroscopic device are polarization-maintaining light paths, so that a relative polarization configuration for an arrangement order of the input light paths of input light to the light path switching device and a relative polarization configuration for an arrangement order of the output light paths, corresponding to the arrangement order of the input light paths, of output light from the spectroscopic device are made the same.

2. The wavelength demultiplexer according to claim 1, wherein the light path switching device is a device that significantly distributes, for at least one input port, an input from the input port to multiple output ports.

3. The wavelength demultiplexer according to claim 1, wherein the light path switching device is provided with, on an input port side thereof and an output port side thereof, delay device configured to reduce an influence of a difference in light path length.

4. A wavelength demultiplexer comprising:
a spectroscopic device configured to separate light input from multiple input light paths and output the separated lights to multiple output light paths; and
a light path switching device configured to switch light paths which are input to the spectroscopic device,
wherein at least one of the light paths which are input to the spectroscopic device being switchable by an external operation, and
wherein a transmission characteristic of the spectroscopic device from an input side thereof to an output side thereof for light paths that are input from the light path switching device is that a frequency width exhibiting flatness with a tolerance of 1 dB is greater than or equal to 37% of an adjacent optical frequency interval on the output side.

5. The wavelength demultiplexer according to claim 1, further comprising:
a wavelength multiplexer configured to obtain inputting light from an output side of the wavelength demultiplexer and output light into an input side of the light path switching device.

6. The wavelength demultiplexer according to claim 2, wherein the light path switching device is provided with, on an input port side thereof and an output port side thereof, delay device configured to reduce an influence of a difference in light path length.

7. The wavelength demultiplexer according to claim 1, wherein the relative polarization configuration comprises the arrangement in the same polarization direction or at the same order or difference in polarization ellipticity and polarization azimuth angle.

* * * * *